United States Patent
Charbonneau et al.

(10) Patent No.: US 9,650,277 B2
(45) Date of Patent: May 16, 2017

(54) METHODS AND SYSTEMS FOR DESTABILIZING FOAM IN EQUIPMENT DOWNSTREAM OF A SUBMERGED COMBUSTION MELTER

(71) Applicant: JOHNS MANVILLE, Denver, CO (US)

(72) Inventors: Mark William Charbonneau, Lakewood, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/752,348

(22) Filed: Jun. 26, 2015

(65) Prior Publication Data

US 2015/0315057 A1 Nov. 5, 2015

Related U.S. Application Data

(62) Division of application No. 13/644,104, filed on Oct. 3, 2012, now Pat. No. 9,096,452.

(51) Int. Cl.
*C03B 5/20* (2006.01)
*C03B 5/225* (2006.01)
(Continued)

(52) U.S. Cl.
CPC ............ *C03B 3/00* (2013.01); *C03B 5/20* (2013.01); *C03B 5/225* (2013.01); *C03B 5/235* (2013.01);
(Continued)

(58) Field of Classification Search
None
See application file for complete search history.

(56) References Cited

U.S. PATENT DOCUMENTS

| | | |
|---|---|---|
| 1,716,433 A | 6/1929 | McKelvey et al. |
| 1,989,103 A | 1/1935 | McKelvey et al. |

(Continued)

FOREIGN PATENT DOCUMENTS

| | | |
|---|---|---|
| DE | 44 24 814 A1 | 1/1996 |
| DE | 100 29 983 C2 | 9/2003 |

(Continued)

OTHER PUBLICATIONS

EP0181248 A1 Machine Translation, Google Patents, Aug. 2, 2016.*

(Continued)

*Primary Examiner* — Lisa Herring
(74) *Attorney, Agent, or Firm* — Robert D. Touslee

(57) ABSTRACT

Methods and systems for de-stabilizing foam produced in submerged combustion melters. A molten mass of glass and bubbles is flowed into an apparatus downstream of a submerged combustion melter. The downstream apparatus includes a floor, a roof and a wall connecting the floor and roof, but is devoid of submerged combustion burners and other components that would increase turbulence of the molten mass. The molten mass has foam on at least a portion of a top surface of the molten mass. Certain methods include imposing a de-stabilizing force directly to the foam or to the molten mass and foam, where the de-stabilizing force may be a vibratory force, an acoustic wave force, a particulate-based force, or a non-particulate-based mechanical force. Systems for carrying out the methods are described.

16 Claims, 7 Drawing Sheets

(51) Int. Cl.
  *C03B 3/00* (2006.01)
  *C03B 5/235* (2006.01)
  *F23C 99/00* (2006.01)
(52) U.S. Cl.
  CPC .......... *C03B 5/2356* (2013.01); *F23C 99/003* (2013.01); *Y02P 40/59* (2015.11)

(56) References Cited

U.S. PATENT DOCUMENTS

| | | |
|---|---|---|
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,245,769 A | 4/1966 | Eck et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,499,743 A | 3/1970 | Fanica et al. |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Booth |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,882,736 A | 11/1989 | Pieper |
| 4,886,539 A | 12/1989 | Gerutti et al. |
| 4,919,700 A | 4/1990 | Pecoraro et al. |
| 4,927,886 A | 5/1990 | Backderf et al. |
| 4,953,376 A | 9/1990 | Merlone |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |

(56) References Cited

U.S. PATENT DOCUMENTS

| | | |
|---|---|---|
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Philippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Philippe et al. |
| 6,071,116 A | 6/2000 | Philippe et al. |
| 6,074,197 A | 6/2000 | Philippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,318,126 B1 | 11/2001 | Takei et al. |
| 6,332,339 B1 | 12/2001 | Kawaguchi et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,398,547 B1 | 6/2002 | Joshi et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,453 B2 | 8/2015 | Charbonneau |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |

(56) References Cited

U.S. PATENT DOCUMENTS

| | | |
|---|---|---|
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Pumode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0279532 A1 | 10/2013 | Ohnstede et al. |
| 2013/0283861 A1 | 10/2013 | Mobley et al. |
| 2014/0090422 A1 | 4/2014 | Charbonneau et al. |
| 2014/0090423 A1 | 4/2014 | Charbonneau et al. |

FOREIGN PATENT DOCUMENTS

| | | |
|---|---|---|
| DE | 10 2005 033330 B3 | 8/2006 |
| EP | 0 181 248 B1 | 10/1989 |
| EP | 1 337 789 B1 | 12/2004 |
| EP | 2 133 315 A1 | 12/2009 |
| EP | 1 986 966 B1 | 4/2010 |
| EP | 1 667 934 B1 | 2/2011 |
| EP | 2 397 446 A2 | 12/2011 |
| EP | 2 433 911 A1 | 3/2012 |
| EP | 2 578 548 A2 | 4/2013 |
| FR | 2 740 860 A1 | 9/1997 |
| GB | 191301772 | 0/1914 |
| GB | 191407633 | 0/1914 |
| GB | 164073 A | 5/1921 |
| GB | 1449439 | 9/1976 |
| GB | 1 514 317 A | 6/1978 |
| IT | 1208172 | 7/1989 |
| KR | 2000 0050572 A | 5/2000 |
| RO | 114827 | 7/1999 |
| WO | 9855411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |
| WO | 2012125665 A1 | 9/2012 |

OTHER PUBLICATIONS

"AccuTru Temperature Measurement," AccuTru International Corporation, 2003.

"Glass Melting Technology—A Technical and Economic Assessment," 2004, U.S. Department of Energy, pp. 1-292.

"Canty Process Technology" brochure, date unknown, copy received in Apr. 2012 at American Institute of Chemical Engineers, Spring Meeting, Houston, TX.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company, release date, 1995.

Report for Treating Hanford LAW and WTP SW Simulants: Pilot Plant Mineralizing Flowsheet Apr. 2009, Department of Energy Environment Management Consolidated Business Center by THOR Treatment Technologies, LLC.

"Glass Technologies—The Legacy of a Successful Public-Private Partnership", 2007, U.S. Department of Energy, pp. 1-32.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Stevenson, "Foam Engineering: Fundamentals and Applications", Chapter 16, pp. 336-389, John Wiiey & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under isothermal Conditions"Journal of the American Ceramic Society, 74(3), pp. 551-555, 1991.

Kim et al., "Foaming in Glass Melts Produced by Sodium Sulfate Decomposition under Ramp Heating Conditions", Journal of the American Ceramic Society, 75(11), pp. 2959-2963, 1992.

Kim et al., "Effect of Furnace Atmosphere on E-glass Foaming", Journal of Non-Crystalline Solids, 352(50/51), pp. 5287-5295, 2006.

Van Limpt et al., "Modelling the evaporation of boron species. Part 1. Alkali-free borosilicate glass melts", Glass Technology—European Journal of Glass Science and Technology, Part A, 52(3): pp. 77-87, 2011.

\* cited by examiner

METHODS AND SYSTEMS FOR DESTABILIZING FOAM IN EQUIPMENT DOWNSTREAM OF A SUBMERGED COMBUSTION MELTER

CROSS-REFERENCE TO RELATED APPLICATIONS

This application is a division of U.S. patent application Ser. No. 13/644,104 filed Oct. 3, 2012, now U.S. Pat. No. 9,096,452, issued Aug. 4, 2015.

This application may be related to the following United States non-provisional patent applications assigned to the Applicant of the present application which are all incorporated by reference herein: U.S. Ser. No. 13/458,211, filed Apr. 27, 2012, now U.S. Pat. No. 9,145,319, issued Sep. 29, 2015; Ser. No. 13/493,219, filed Jun. 11, 2012, now U.S. Pat. No. 9,096,453, issued Aug. 4, 2015; Ser. No. 13/644,058, filed Oct. 3, 2012, now U.S. Pat. No. 9,492,831, issued Nov. 15, 2016 and Ser. No. 13/633,979 filed Oct. 3, 2012. This application may be related to the following United States Patents assigned to the Applicant of the present application which are all incorporated by reference herein: U.S. Pat. Nos. 8,707,739; 8,707,740; 8,769,992; 8,875,544; 8,973,405; 8,991,215; 8,997,525; 9,021,838; and 9,032,760.

BACKGROUND INFORMATION

Technical Field

The present disclosure relates generally to the field of combustion furnaces and methods of use to produce glass, and more specifically to methods and systems to destabilize foam in glass handling equipment downstream of a submerged combustion melter.

Background Art

A submerged combustion melter (SCM) may be employed to melt glass batch materials to produce molten glass by passing oxygen, oxygen-enriched mixtures, or air along with a liquid, gaseous fuel, or particulate fuel in the glass batch, directly into a molten pool of glass usually through burners submerged in a glass melt pool. The introduction of high flow rates of oxidant and fuel into the molten glass, and the expansion of the gases cause rapid melting of the glass batch and much turbulence, and possibly foaming. Certain SCMs and/or flow channels may employ one or more high momentum burners, for example, to impinge on portions of a foam layer. High momentum burners are disclosed in Applicant's U.S. Pat. No. 9,021,838. "High momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second).

Often it is a primary goal to melt batch or other feed materials in an SCM as quickly and with as small a footprint SCM as possible. Although this is still desired for the most part, one drawback to this strategy in known submerged combustion systems and methods of melting glass-forming materials using an SCM is the tendency of the foam formed in the SCM to be resistant to destruction or even reduction. This may cause one or more problems in equipment downstream of the SCM, for example, glass conditioning and transport may be hindered as the foam layer may serve as an insulator and may limit the amount of energy capable of being transferred to the molten glass to maintain its temperature. Foam found in (or on top of) glasses typically exists as stable tetrahedral bubbles which need an outside influence to de-stabilize them and therefore break the foam, allowing heat transfer into the glass from burners located above the glass line. In addition, the foam may be destructive of forehearth heating systems and construction materials. In extreme cases, the foam may cause systems to require shutdown, maintenance and may result in a process upset. Attempts to reduce the foam through process adjustments, summarized in "Glass Industry of the Future", U.S Dept. of Energy, Report 02-GA50113-03, Sep. 30, 2008, such as use of helium and steam to scavenge and consolidate bubbles, sonic methods to consolidate bubbles, vacuum to increase bubble size, and centrifugal force have not met with complete success in reducing foam to an acceptable amount.

It would be an advance in the glass manufacturing art if foam produced during submerged combustion melting of glass-forming materials could be de-stabilized, reduced, or even completely destroyed in equipment downstream of the SCM.

SUMMARY

In accordance with the present disclosure, methods and systems are described which reduce or overcome one or more of the above problems.

A first aspect of the disclosure is a method comprising:

flowing a molten mass of glass and bubbles into an apparatus downstream of a submerged combustion melter, the downstream apparatus comprising a floor, a roof, and a wall connecting the floor and the roof, the downstream apparatus devoid of submerged combustion burners and other components that would increase turbulence of the molten mass, the molten mass having foam on at least a portion of a top surface of the molten mass; and imposing a de-stabilizing force directly to the foam or to the molten mass and foam, the force selected from the group consisting of a vibratory force, an acoustic wave force, a particulate-based force, and a non-particulate-based mechanical force.

A second aspect of the disclosure is a system comprising:

an apparatus configured to be fluidly connected downstream of a submerged combustion melter, the downstream apparatus comprising a floor, a roof, a wall structure connecting the floor and roof, the floor, roof, and wall structure defining an internal space configured to contain a flowing or non-flowing molten mass of glass and foam, the apparatus devoid of submerged combustion burners and other components that would increase turbulence of the molten mass, the molten mass having foam on at least a portion of a top surface of the molten mass; and one or more de-stabilization apparatus configured to impose a de-stabilizing force directly to the foam or to the molten mass and foam, the de-stabilization apparatus selected from the group consisting of a vibration apparatus, an acoustic wave force generating apparatus, a particulate-based force generating apparatus, and a non-particulate-based mechanical force generating apparatus.

Methods and systems of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1A:
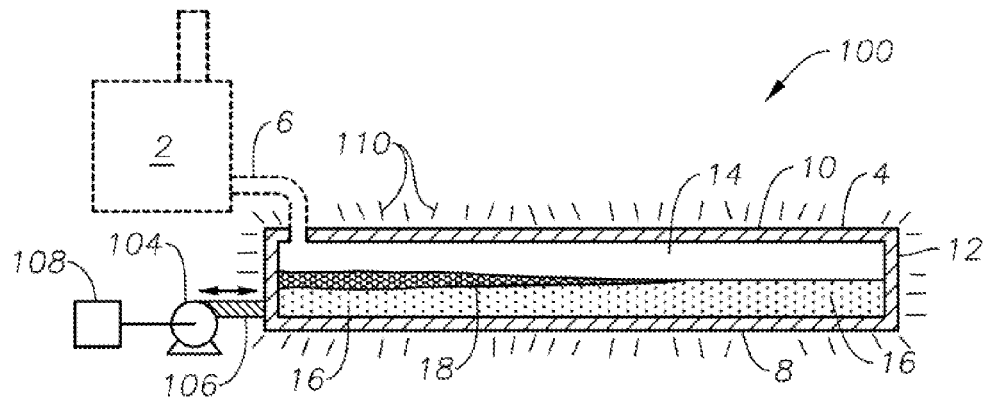
FIGS. 1A, 1B, 1D, 1F, 1H, 1J, 2A, 2C, and 2E are schematic side elevation views, partially in cross-section, of various system embodiments in accordance with the present disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to present submerged combustion melting systems and methods is that the foam formed in the SCM may cause one or more problems in equipment downstream of the SCM, for example, glass conditioning and transport may be hindered as the foam layer may serve as an insulator and may limit the amount of energy capable of being transferred to the molten glass to maintain its temperature. Foam found in (or on top of) glasses typically exists as stable tetrahedral bubbles which need an outside influence to de-stabilize them and therefore break the foam.

Applicants have discovered certain methods and systems that may reduce or eliminate such shortcomings.

Various terms are used throughout this disclosure. "Submerged" as used herein means that combustion gases emanate from a combustion burner exit that is under the level of the molten glass; and "non-submerged" means that combustion gases do not emanate from combustion burner exits under the level of molten glass. Both submerged and non-submerged burners may be roof-mounted, floor-mounted, wall-mounted, or any combination thereof (for example, two floor mounted burners and one wall mounted burner). "SC" as used herein means "submerged combustion" unless otherwise specifically noted, and "SCM" means submerged combustion melter unless otherwise specifically noted.

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both.

As used herein the term "combustion" means deflagration-type combustion unless other types of combustion are specifically noted, such as detonation-type combustion. Deflagration is sub-sonic combustion that usually propagates through thermal conductivity; hot burning material heats the next layer of cold material and ignites it. Detonation is supersonic and primarily propagates through shock. As used herein the terms "combustion gases" and "combustion products" means substantially gaseous mixtures of combusted fuel, any excess oxidant, and combustion products, such as oxides of carbon (such as carbon monoxide, carbon dioxide), oxides of nitrogen, oxides of sulfur, and water, whether from deflagration, detonation, or combination thereof. Combustion products may include liquids and solids, for example soot and unburned or non-combusted fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "downstream apparatus" means a container, channel or conduit defined at least by a floor and a wall structure extending upwards from the floor to form a space in which molten glass may be present, whether flowing or not. In certain embodiments the downstream apparatus will include a roof and a wall structure connecting the floor and roof. The downstream apparatus may have any operable cross-sectional shape (for example, but not limited to, rectangular, oval, circular, trapezoidal, hexagonal, and the like) and any flow path shape (for example, but not limited to, straight, zigzag, curved, and combinations thereof). In certain systems and methods the downstream apparatus may be a flow channel selected from the group consisting of a conditioning channel, a distribution channel, and a forehearth.

Conduits used in particle guns and other devices, such as hoppers used for delivery of particles, and mechanical structures such as screens, paddles, blades, and the like useful in systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and flow channels, and refractory burner blocks (if used), include fused zirconia ($ZrO_2$), fused cast AZS (alumina-zirconia-silica), rebonded AZS, or fused cast alumina ($Al_2O_3$). The particular system and method, downstream apparatus, burner geometry, foam de-stabilization apparatus, and type of glass to be produced may all dictate the choice of a particular material, among other parameters.

Certain foam de-stabilization apparatus useful in systems and methods of this disclosure may be fluid-cooled.

Certain systems of this disclosure may comprise one or more non-submerged detonation combustion burners, which may be used for heating and/or foam destruction purposes. Suitable non-submerged combustion burners may comprise a fuel inlet conduit having an exit nozzle, the conduit and nozzle inserted into a cavity of a ceramic burner block, the ceramic burner block in turn inserted into either the roof or the wall structure, or both the roof and wall structure of the downstream apparatus.

In certain systems, one or more detonation and deflagration combustion burners may be adjustable with respect to direction of flow of the combustion products. Adjustment may be via automatic, semi-automatic, or manual control. Certain system embodiments may comprise a burner mount that mounts the burner in the wall structure, roof, or floor of the downstream apparatus comprising a refractory, or refractory-lined ball joint. Other burner mounts may comprise rails mounted in slots in the wall or roof. In yet other embodiments the burners may be mounted outside of the downstream apparatus, on supports that allow adjustment of the combustion products flow direction. Useable supports include those comprising ball joints, cradles, rails, and the like.

In certain systems and methods of the present disclosure, the downstream apparatus may comprise a flow channel comprising a series of sections, and may comprise one or more skimmers and/or impingement (high momentum) burners, such as described in assignee's U.S. Pat. Nos. 9,021,838 and 8,707,739. Certain systems and methods of the present disclosure may utilize measurement and control schemes such as described in Applicant's co-pending application U.S. Ser. No. 13/493,219, filed Jun. 11, 2012, now U.S. Pat. No. 9,096,453, issued Aug. 4, 2015, and/or feed batch densification systems and methods as described in Applicant's co-pending application U.S. Ser. No. 13/540,704, filed Jul. 3, 2012. Certain systems and methods of the present disclosure may utilize devices for delivery of treating compositions such as disclosed in Applicant's U.S. Pat. No. 8,973,405.

Certain system and method embodiments of this disclosure may be controlled by one or more controllers. For example, detonation burner and/or pulsed detonation device combustion (flame) temperatures may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a controller which receives one or more input parameters selected from temperature of melt, composition of bubbles and/or foam, height of foam layer, and combinations thereof, and may employ a control algorithm to control combustion temperature, flow rate and/or composition of foam de-stabilization compositions, vibration or oscillation of components, movement of mechanical foam de-stabilization devices into and out of contact with foam, and other output parameters based on one or more of these input parameters.

Specific non-limiting system and method embodiments in accordance with the present disclosure will now be presented in conjunction with the attached drawing figures. The same numerals are used for the same or similar features in the various figures. In the views illustrated in the drawing figures, it will be understood in each case that the figures are schematic in nature, and certain conventional features may not be illustrated in all embodiments in order to illustrate more clearly the key features of each embodiment. The geometry of forehearth 4 or other downstream apparatus is illustrated generally the same in the various embodiments, but that of course is not necessary.

The system embodiments illustrated in FIGS. 1 and 2 present one or more de-stabilization apparatus configured to impose a de-stabilizing force directly to the foam or to the molten mass and foam. FIGS. 1A, 1B, 1D, 1F, 1H, 1J, 2A, 2C, and 2E are schematic side elevation views, partially in cross-section, of various system embodiments in accordance with the present disclosure, and FIGS. 1C, 1E, 1G, 1I, 1K, 2D, and 2F are schematic transverse cross-sectional views of the system embodiments illustrated in FIGS. 1B, 1D, 1F, 1H, 1J, 2A, 2C, and 2E, respectfully.

FIG. 1A is a schematic side elevation view, partially in cross-section, of one system embodiment 100 in accordance with the present disclosure. In all of the drawing figures where an SCM is illustrated, such as at 2 in FIG. 1A, the SCM is illustrated in dashed lines, indicating that the SCM is not, strictly speaking, a part of every system and method of the present disclosure. However, certain systems and methods may be described as comprising an SCM and one or more downstream apparatus receiving flow of molten glass and foam from the SCM. Molten glass and foam produced in SCM 2 flow into a forehearth or other downstream apparatus 4 via a melter exit structure 6, also illustrated in dashed lines. Downstream apparatus 4 comprises in this embodiment a floor 8, a roof 10, and a sidewall structure 12 connecting floor 8 and roof 10, and these components define an internal space 14 that confines a flowing or non-flowing mass of molten glass 16 having a foam layer 18 generally on a top surface thereof. In certain embodiments, roof 10 may not be present. One or more apertures 20 (please see FIG. 1B) in roof 10 and/or wall structure 12 may be present as described herein.

SC burners (not illustrated) in SCM 2 produce a turbulent melt comprising bubbles having a bubble atmosphere. In general the atmosphere of the bubbles is about the same from bubble to bubble, but that is not necessarily so. The bubbles form bubble layer 18. One or more burners in SCM 2 may be oxy/fuel burners. SCM 2 may receive numerous feeds through one or more inlet ports, and batch feeders maybe provided. Other feeds are possible, such as glass mat waste, wound roving, waste materials, and the like, such as disclosed in Applicant's U.S. Pat. No. 8,650,914.

In accordance with the present disclosure, de-stabilization apparatus may be selected from vibration apparatus, acoustic wave force generating apparatus, particulate-based force generating apparatus, and non-particulate-based mechanical force generating apparatus. Embodiment 100 illustrated schematically in FIG. 1A employs a vibration apparatus 104 connected to downstream apparatus 4 via one or more connecting members 106. Connecting member(s) 106 may be connected to one or more of floor 8, wall structure 12, and roof 10 of downstream apparatus 4. Vibration apparatus 104 may be selected from electric, hydraulic, and pneumatic vibration apparatus. Vibration apparatus 104 may be configured to impose a vibratory motion (indicated schematically by the plurality of dashes, 110) having a frequency and amplitude to the glass and foam sufficient to de-stabilize bubbles in one or more portions or locations of foam 18 and cause at least some, and in certain embodiments a majority, of the bubbles in foam 18 to break. The vibratory motion may be in one or more directions, for example horizontal vibration only, vertical vibration only, or motions having both horizontal and vertical portions. The vibratory motion may be substantially constant over a given time period, or may vary in frequency and/or amplitude over time. In certain exemplary systems and methods vibration apparatus 104 may be configured to vary the frequency and/or amplitude using a controller 108 to identify an optimal frequency for de-stabilizing the majority of the bubbles in foam 18 and cause at least a majority of the bubbles in foam 18 to break. Vibration apparatus 104 are commercially available from a number of sources, for example, products available from Deca Vibrator Industries, Inc., Mokena, Ill. (USA), which offers industrial vibrators powered by pneumatic, electric, or hydraulic drives, and are available in rotary or linear models with fixed and portable mounting systems. Stainless steel and explosion proof vibrators for hazardous environments are also available. Certain embodiments may comprise the entire downstream apparatus being placed on a vibratory table (not illustrated), in which systems vibration apparatus 104 would be mechanically coupled to the vibration table.

Figure 1B:
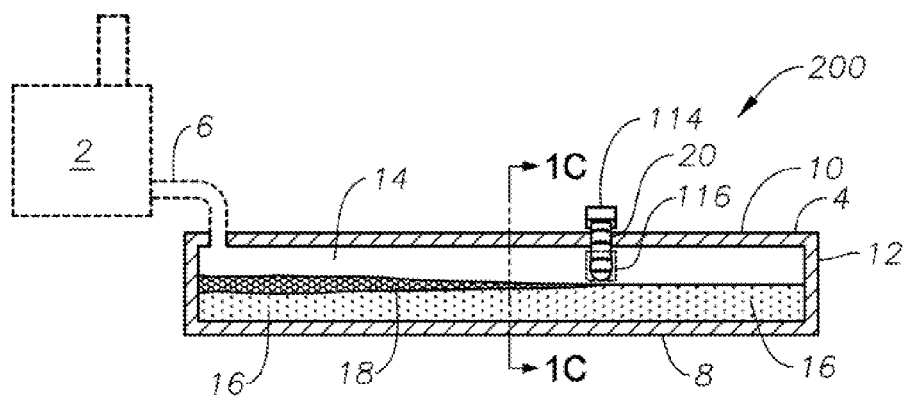
Figure 1C:
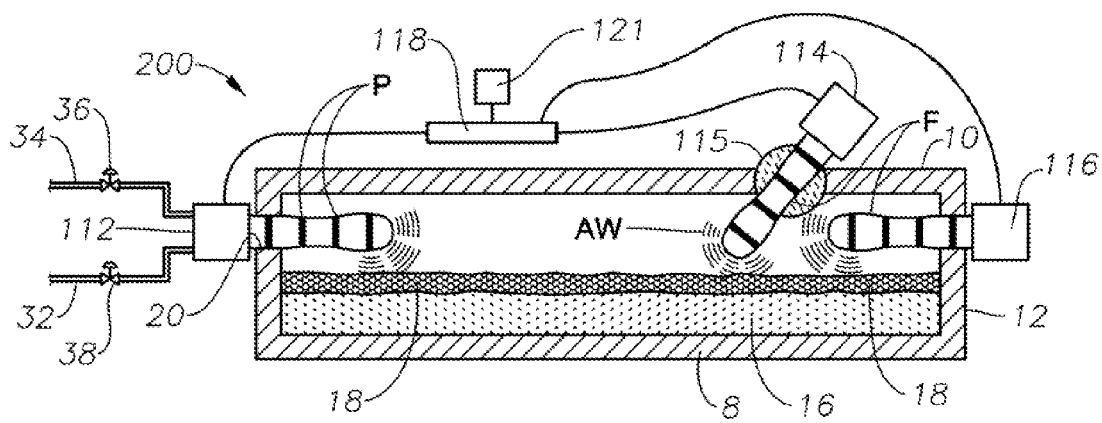
FIGS. 1C, 1E, 1G, 1I, 1K, 2D, and 2F are schematic transverse cross-sectional views of the system embodiments illustrated in FIGS. 1B, 1D, 1F, 1H, 1J, 2A, 2C, and 2E, respectfully.

Another class of de-stabilizing apparatus are acoustic wave force generating apparatus, one example including one or more pulsed, non-foam-impinging, non-submerged combustion burners as illustrated in embodiment 200 of FIGS. 1B and 1C. Embodiment 200 features multiple pulsed, non-foam-impinging, non-submerged combustion burners 112, 114, and 116, with each burner controlled via electronic communication with a controller 118, having access to a pulse frequency and/or pulse amplitude adjustment device 121, which may or may not be integral with controller 118. Electronic communication between controller 118 and burners 112, 114, and 116 may either be performed using wired or wireless communication. As illustrated in FIG. 1C, combustion products or flames "F" of pulsed burners 112, 114, and 116 do not directly impinge upon foam layer 18, but through their pulsed or oscillating nature, impose acoustic waves "AW" onto foam 18. Acoustic waves "AW" are illustrated emanating generally from flames "F" or combustion products. One or more burners 112, 114, 116 may be positionable, for example using a ball turret 115 made of high-temperature ceramic or other material.

Valves 36, 38 and appropriate valve controls (not illustrated) may be provided to pulse or oscillate flow of fuel and/or oxidant flowing to burners 112, 114, and 116 through conduits 32, 34, respectively. Lines "P" indicate pulses of combustion products produced by pulsing or oscillating oxidant and/or fuel valves 36, 38. The pulsing may be random or non-random, and may provide certain benefits, such as reduced NOx emissions. The principle and the various methods of implementation are broadly described in U.S. Pat. No. 4,846,665, U.S. Pat. No. 5,302,111, U.S. Pat. No. 5,522,721, and U.S. Publication No. 2006/0177785. The main idea is to pulse the flow of fuel and/or oxidant being supplied to at least one burner 112, 114, 116, to generate successive fuel-rich and fuel-lean zones in a flame. In certain embodiments, the flow rate of a main or primary oxidant may be controlled by a main oxidant flow rate control unit, and oscillating combustion may be generated by oscillating the fuel flow with an oscillating valve and combusting the oscillating fuel with the main oxidant adjacent the burner to produce combustion products. A post-combustion oxidant may also be injected into the combustion products, and the injection rate of the post-combustion oxidant may be controlled by a post-combustion oxidant flow rate control unit. The combustion products and the injected post-combustion oxidant may then be combusted. A rate of the fuel flow may be predetermined. A controller may be provided that may be operatively associated with the main oxidant flow rate control unit, the oscillating valve, and the post-combustion oxidant flow rate control unit. A value or values associated with one or more combustion parameters (including a rate of flow of the main oxidant, a rate of flow of the post-combustion oxidant, a frequency of the oscillating fuel flow, an amplitude of the oscillating fuel flow, a duty cycle of the oscillating fuel flow) nay be determined. The combustion parameter associated with the determined value or values may be adjusted. The determined value or values may be based upon the predetermined fuel flow rate. The determining step may be performed by the controller.

In embodiment 200, burners 112, 114, and 116 may be high- or low-momentum detonation combustion burners, and the combustion products or flames do not directly impinge or touch foam layer 18 to de-stabilize the foam, but rely on acoustic wave forces as described.

Figure 1D:
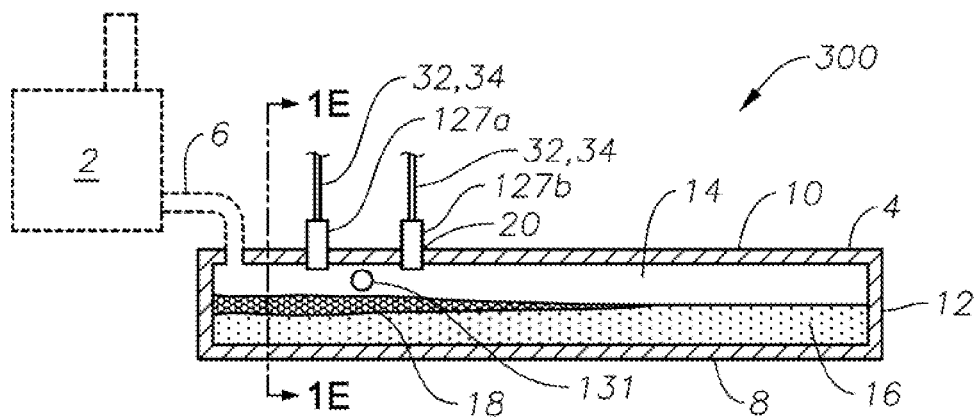
Figure 1E:
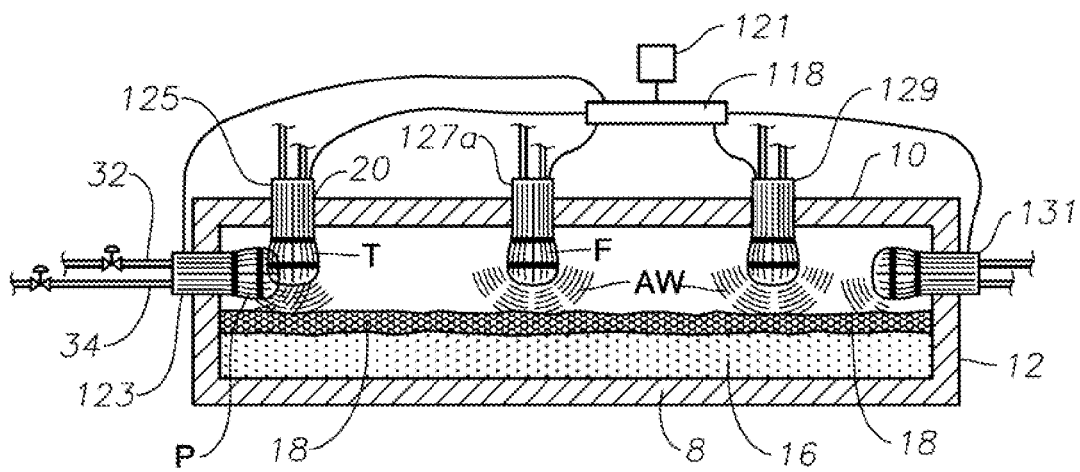

Another embodiment including one or more acoustic wave force generating apparatus is embodiment 300 illustrated schematically in FIGS. 1D and 1E, which may include one or more pulsed detonation engines (PDE) 123, 125, 127, 129, and 131 positioned in corresponding apertures 20 in wall 12 and/or roof 10 of downstream apparatus 4. FIG. 1D illustrates two PDEs 127a, 127b, spaced apart longitudinally along a central longitudinal axis of downstream apparatus 4. PDEs may have many constructions, but are essentially single-pipe burners having a source of fuel and a source of oxidant attached near a rear end of pipe or conduit, sometimes referred to as a barrel. As illustrated schematically in FIGS. 1D and 1E, PDEs may be positioned in multiple longitudinal and transverse positions in downstream apparatus 4, examples being the relative longitudinal positions of PDEs 127a, 127b illustrated schematically in FIG. 1D, and the relative transverse positions of PDEs 125, 127, and 129 illustrated schematically in FIG. 1E. As with other embodiments, a controller 118 and device 121 to modulate frequency and/or amplitude of acoustic waves emanating from the detonation combustion of the PDEs may be provided. As indicated schematically in FIG. 1E, PDEs due to their nature not only provide acoustic waves AW by virtue of the pulsed nature of the detonation combustion and flames F, they also provide an element of thrust "T" as indicated by the streamlines in each PDE flame F. The principle of the PDE process is quite simple, and discussed in an article by Babul et al., "Production of Coatings With Use of Gas Detonation Engine Parts Production and Regeneration Applications", *Journal of*

*KONES Powertrain and Transport*, Vol. 18, No. 3 2011. A conduit, pipe (barrel), closed at one end, is filled with a combustible gas mixture generated in a mixing and detonation chamber. In certain embodiments propane-butane or acetylene may be mixed with oxygen. The mixture in the detonation chamber is then ignited. Initially, there is a deflagration and next there is deflagration to detonation transition and eventually the detonation wave propagates along the barrel. The velocity of the detonation products behind the detonation wave is of order of 1000-1400 m/s and temperature is of order of 3500 K. In certain embodiments, such as embodiment 600 discussed herein, a particulate material may be injected in a form of fine particles into the barrel. The particles of the material are accelerated and heated up by the detonation products and after flowing out from the barrel they hit the foam and, in accordance with the present disclosure, will tend to break up the foam. In embodiment 300 illustrated schematically in FIGS. 1D and 1E, merely the acoustic waves "AW" produced by the PDEs are employed to break up bubbles of foam.

Figure 1F:
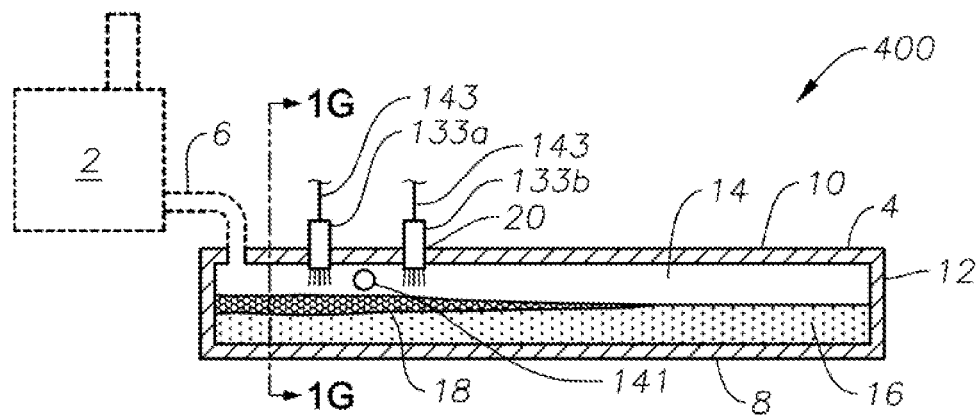
Figure 1G:
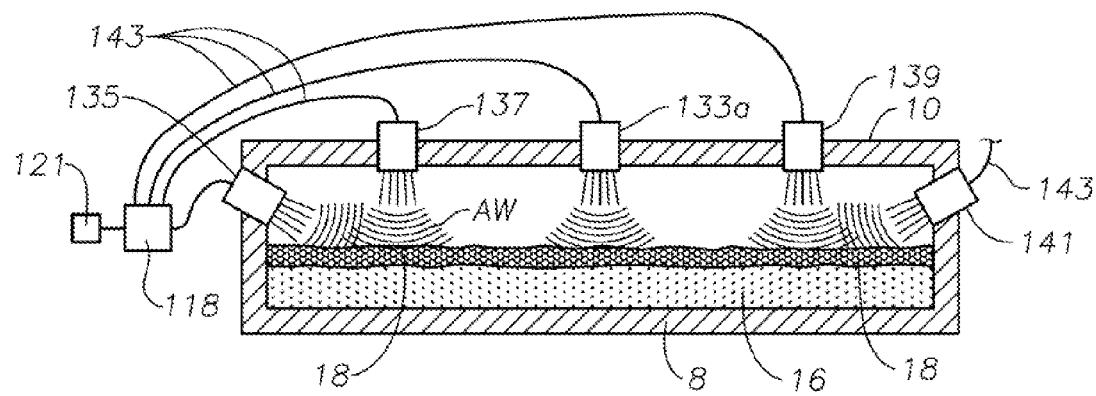

Yet another embodiment including one or more acoustic wave force generating apparatus is embodiment 400 illustrated schematically in FIGS. 1F and 1G, which includes one or more audio speaker drivers 133, 135, 137, 139, and 141 positioned in corresponding apertures 20 in wall 12 and roof 10 of downstream apparatus 4. In certain embodiments wires 143 may connect the drivers and speakers to a controller 118 having capability of varying frequency and/or amplitude of the speaker output using a separate device 121. Controller 118 may include an amplifier, or the amplifier may be present as a separate component. In certain embodiments the speaker drivers may be wirelessly electronically connected to controller 118 and/or device 121. As illustrated schematically in FIGS. 1F and 1G, speaker drivers may be positioned in multiple longitudinal and transverse positions in downstream apparatus 4, examples being the relative longitudinal positions of speaker drivers 133*a* and 133*b*, and the relative transverse positions of speaker drivers 133, 137, and 139. Speaker drivers include a diaphragm that moves back and forth to create pressure waves in the air column in front, and depending on the application, at some angle to the sides. The diaphragm is typically in the shape of a cone for low and mid frequencies or a dome for higher frequencies, or less commonly, a ribbon, and is usually made of coated or uncoated paper or polypropylene plastic. More exotic materials may be used on some drivers, such as woven fiberglass, carbon fiber, aluminum, titanium, and polymeric films as the cone, dome or radiator. In the present disclosure, due to the high temperatures present in glass manufacturing, one or more of the exotic materials may be preferred. In any case, all speaker drivers have a means of electrically inducing back-and-forth motion of the diaphragm. Typically there is a tightly wound coil of insulated wire (known as a voice coil) attached to the neck of the drivers cone. In a ribbon speaker the voice coil may be printed or bonded onto a sheet of very thin paper, aluminum, fiberglass or plastic. This cone, dome or other radiator is mounted to a rigid chassis that supports a permanent magnet in close proximity to the voice coil. For the sake of efficiency the relatively lightweight voice coil and cone are the moving parts of the driver, whereas the much heavier magnet remains stationary. Other typical components are a spider or damper, used as the rear suspension element, simple terminals or binding posts to connect the audio signal, and possibly a compliant gasket to seal the joint between the chassis and enclosure.

In accordance with the present disclosure, speaker drivers may be mounted into a rigid enclosure of metal, ceramic material, or ceramic-coated metal, and mounted in roof 10 or wall 12 of downstream apparatus 4. The enclosures isolate the acoustic energy from the front of the cone from that of the back of the cone. A horn (not illustrated) may be employed to increase efficiency and directionality. A front grille or other acoustically neutral screen (not illustrated) may be provided to protect the driver from physical damage. In operation, a signal is delivered to the voice coil by means of electrical wires or wireless communication from an amplifier, then through flexible tinsel wire to the moving coil. The current creates a magnetic field that causes the diaphragm to be alternately attracted to, and repelled by, the fixed magnet as the electrical signal varies. The resulting back-and-forth motion drives the air in front of the diaphragm, resulting in pressure differentials that travel away as sound waves, indicated at "AW" in FIG. 1G. Speaker drivers may be designed to operate within a broad or narrow frequency range. Small diaphragms are not well suited to moving the large volume of air that is required for satisfying low frequency response. Conversely, large drivers may have heavy voice coils and cones that limit their ability to move at very high frequencies. Drivers pressed beyond their design limits may have high distortion, but this may not be a major concern in the present application.

In certain embodiments, such as embodiment 400 illustrated in FIGS. 1F and 1G, where multiple speaker drivers are present, specialized drivers may be provided to produce specific frequency ranges, and a crossover may split the incoming signal. In embodiments according to the present disclosure, suitable frequencies may range from about 10 Hz to about 80,000 Hz, or from about 2000 Hz to about 60,000 Hz, while suitable amplitudes may range from about 80 decibels (db) to about 130 db, or from about 90 db to about 125 db.

Those skilled in this art will readily recognize after having read this disclosure that systems and methods comprising combinations of any two or more of the various embodiments described herein may be combined. For example, systems and methods where vibration, such as in embodiment 100, may also include one or more speaker drivers, as in embodiment 400.

In order to determine which of the many foam de-stabilization apparatus and techniques may work best for any given situation may take a small amount of experimentation, but the degree of experimentation is not considered to be extensive or undue. Basically, the molten mass of glass and foam is allowed to enter the downstream apparatus, and one or more of the foam de-stabilization techniques begun soon thereafter, and tuned to achieve the greatest de-stabilization effect on the foam. If the foam for some reason is so stable as to not be affected at all by the particular de-stabilization apparatus or method, it may simply be discontinued.

Figure 1H:
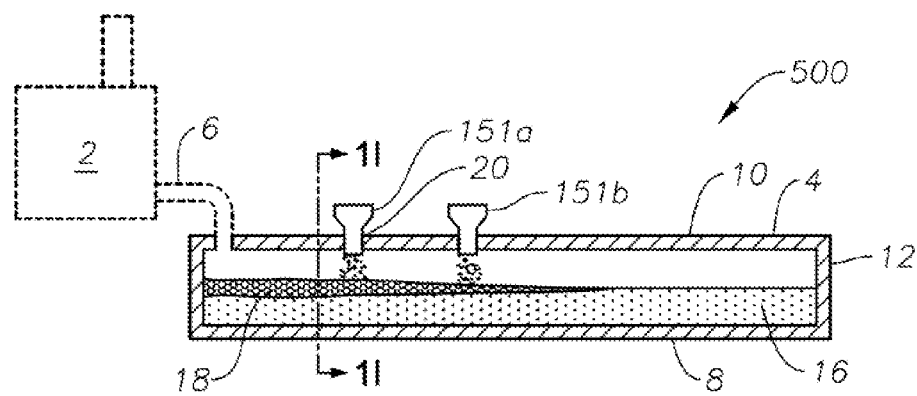
Figure 1I:
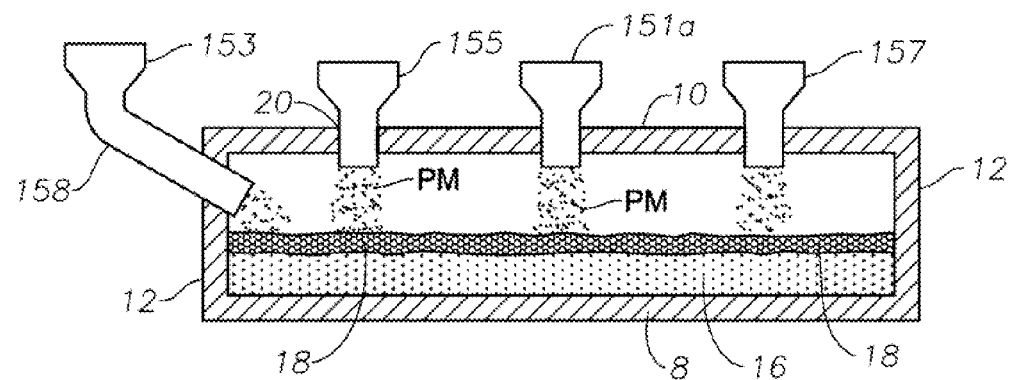

Another class or type of foam de-stabilization system and method is the use of a particulate-based force generating apparatus. Two embodiments, 500 and 600, are now discussed in relation to FIGS. 1H, 1I, 1J, and 1K. Embodiment 500 comprises one or more hoppers 151, 153, 155, and 157 containing one or more particles or particulate matter "PM" that may simply be dropped onto portions of foam 18 in downstream apparatus 4. One or more hoppers may route particles through roof 10, through sidewall 12, or through both as illustrated schematically in FIG. 1I, through apertures 20. As illustrated schematically in FIGS. 1H and 1I, hoppers may be positioned in multiple longitudinal and transverse positions in downstream apparatus 4, examples being the relative longitudinal positions of hoppers 151*a* and 151*b*, and the relative transverse positions of hoppers 151*a*, 155, and 157. In the case of hopper 153, a downward-slanting chute 158 may be provided. Each aperture 20 may have a corresponding hopper as illustrated in FIGS. 1H and 1I, or one hopper may feed several apertures 20. While it is contemplated that that particulate will flow merely by gravity from the hoppers, and the hoppers need not have a pressure above the solids level, certain embodiments may include a pressurized headspace above the solids in the hoppers. In embodiments such as embodiment 500, the teachings of Applicant's co-pending application Ser. No. 13/540,704, filed Jul. 3, 2012, describing various screw-feeder embodiments, and teaching of feed material compaction may be useful, although in the present methods and systems loss of batch or other feed material is not the primary concern. In fact, in terms of foam de-stabilization, uncompacted batch or other particulate matter may be preferred. One or more of the hoppers may include shakers or other apparatus common in industry to dislodge overly compacted solids and keep the particles flowing. Furthermore, each hopper may have a valve other apparatus to stop or adjust flow of particulate matter into downstream apparatus 4. These details are not illustrated for sake of brevity.

Figure 1J:
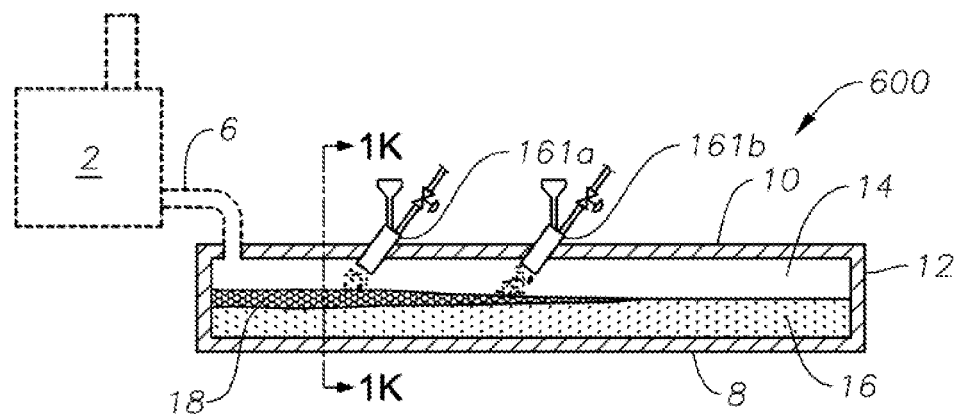
Figure 1K:
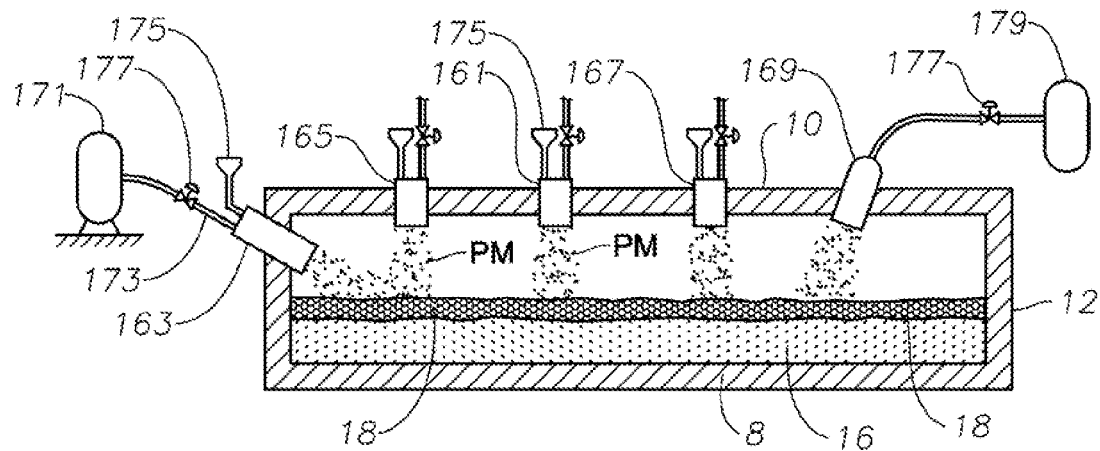

FIGS. 1J and 1K illustrate schematically another embodiment 600 of particulate-based force generating apparatus. One or more particle guns 161, 163, 165, and 167 may be positioned in corresponding apertures in wall 12, roof 10, or both and configured to propel the plurality of particles "PM" onto at least a portion of the foam with sufficient momentum to break at least a portion of bubbles forming the foam. Each particle gun 161, 163, 165, and 167 may have its own hopper 175, or multiple particle guns may share a hopper. In any case, a source 171 of compressed gas, such as a source of compressed dry air, routes the compressed gas through a conduit 173 and control valve 177 to particle gun 163, which then routes the particles and some of the gas toward foam layer 18 and impinges directly thereon. (Only one arrangement of compressed gas source, feed conduit, and control valve is illustrated in FIG. 1K, it being understood that each particle gun includes a similar arrangement). The amount and pressure of compressed gas that will be required will depend on the type and composition of the particles, their density and degree of compaction, feed rate of particles to the individual particle guns, which in turn depends on the degree to which foam is to be de-stabilized. It is contemplated that the particle guns may be positionable using a ball turret or other device, such as illustrated in FIG. 1C with respect to the use of low momentum burners, but this is not necessarily so. In the case of carbon dioxide particles being used, a special type of particle gun, informally referred to as a snow horn 169, may be used. Snow horn 169 would be fed gaseous or liquid carbon dioxide from a storage tank 179 or other facility, such as a pipeline, and flow adjusted through a supply conduit and control valve 177. Snow horns are well understood by those skilled in the art and require little explanation. Reference may be made to the following U.S. Pat. Nos. 3,492,829; 3,786,644; and 4,415,346. As an alternative, in certain embodiments, rather than directing carbon dioxide snow into the downstream apparatus and onto the foam layer 18, the snow (which may be rather fluffy and less dense than required to have a major impact on the foam) may be compacted into pellets (perhaps of a few millimeters dimension), and those pellets directed toward the foam using one of the particle guns.

The particles used in embodiments 500 and 600 may have any composition suitable to break foam bubbles and not have a substantial deleterious effect on the molten glass being produced. The hoppers and particle guns may be configured to drop or shoot particles selected from sulfur-containing compounds, glass cullet, ground glass, particles comprising a chemistry compatible with and integratable into the molten glass (such as one or more of the ingredients listed in Table 1 for producing E-glass, or other glasses), frozen carbon dioxide, solid organic matter, and combinations and mixtures of any two or more of these. In certain embodiments the particles may "pop" or expand suddenly upon impacting the glass foam, providing a secondary foam de-stabilization or foam destruction mechanism. An example of this might be when using carbon dioxide snow or pellets, which through sublimation turn directly from solid to gas. Useful particulate materials may include certain nano-materials, for example but not limited to nanosilicon particles, nanoclays, carbon nanotubes, carbon spherical morphologies such as buckminsterfullerene ($C_{60}$, $C_{70}$, and the like), and diamond may act to impart one or more high-stress locations in a bubble film, forming one or more inclusions, and therefore reduce bubble stability. Certain of the above-mentioned nano-materials (such as nanoclays), in specified quantities, may increase stability of foams. Finally, it has been found that certain treatment compositions may function to both increase and decrease stability of bubbles in foam 18, depending on the quantity added. For example, sodium sulfate may act as both a stabilizing and a de-stabilizing agent depending on the quantity added. At low levels (about 1 wt. percent or lower, as a percentage of an aqueous treating composition) this compound may act as a surfactant and may improve stability of the bubbles. However at higher levels (about 5 wt. percent or above) the reduction in surface tension may overcome the stabilizing action of the surfactant and cause bubble collapse.

Particle guns may be configured to propel the plurality of particles using processes selected from non-reactive compressed gas propulsion, propulsion based on gas expansion due to one or more chemical reactions, electromagnetic propulsion, and combinations thereof. It is contemplated that use of non-reactive compressed gas propulsion will be the least expensive method, however this may not be true in all embodiments, and may not produce the best results in terms of foam de-stabilization.

Yet another type of foam de-stabilization of the present disclosure utilizes one or more non-particulate-based mechanical force generating apparatus in the downstream apparatus. Certain embodiments of this type of device comprise one or more screen-like foam-disturbing devices comprising a material resistant to the molten glass and foam in the downstream apparatus. Screen-like foam-disturbing devices may be selected from the group consisting of one or more screens, one or more nonwoven materials, and one or more woven materials. One system embodiment 700 of this type is illustrated schematically in FIGS. 2A and 2B, comprising a screen 481 configured to contact at least a portion of foam 18 in a continuous or intermittent fashion. Screen 481 may have any desirable mesh size, and those skilled in this art will be able to quickly determine the appropriate screen mesh to use without undue experimentation. Larger mesh size (smaller openings) may be more effective in de-stabilizing certain foams than smaller mesh sizes (larger screen openings) and vice versa. Screen 481 in this embodiment is connected to four connectors 483 at respective corners of the rectangular screen, which in turn are connected to respective actuators 485 able to move screen 481 into an out of contact with foam layer 18 as indicated by the double-headed arrows in FIG. 2A. Actuators 485 may be controlled individually using individual controllers, or all together by one or more controllers 487. It will be understood that suitable non-particulate-based mechanical force generating apparatus may have any number of shapes and sizes, and may be connected to more or less actuators than illustrated schematically in FIGS. 2A and 2B. Furthermore, all portions of the non-particulate-based mechanical force generating apparatus need not travel the same vertical or horizontal distance; for example, the downstream end of screen 481 may travel further downward than the upstream end, and/or the port side may travel further than the starboard side. Actuators 485 may be hydraulic, pneumatic, electric, or some combination thereof. Examples include hydraulic cylinders, air-driver cylinders, jackscrews, and the like. If desired, a vibratory device 489 may be employed to "shake" or otherwise gyrate screen 481.

Another non-particulate-based mechanical force generating apparatus one or more non-screen-like, foam-disturbing devices comprising a material or materials resistant to the molten glass and foam in the downstream apparatus, and configured to contact at least a portion of the foam in a continuous or intermittent fashion. Certain embodiments of this type of foam de-stabilization device may comprise one or more moveable elongate members that are substantially parallel to a level of the molten glass in the downstream apparatus. Other embodiments of this type of foam de-stabilization device may comprise one or more moveable elongate members that are all substantially perpendicular to the level of the molten glass in the downstream apparatus. Yet other embodiments of this type of foam de-stabilization device may comprise one or more moveable relatively flat or curved plates, blades, paddles, or wings. Combinations of these embodiments may be employed as well, such as illustrated schematically in system embodiment 800 of FIGS. 2C and 2D, which comprises a one or more substantially vertical, rotatable elongate members 502 connected to a substantially vertical, rotatable shaft 504 and motor 506, and one or more substantially horizontal, rotatable elongate members 508 coupled to a shaft 512 and motor 514 through a gear box 510. Shafts 504, 512 may be actuated by other prime movers (for example combustion engines, steam engines, or turbines). Motors 506, 514 may be configured to be able to move the substantially vertical and horizontal shafts into and out of contact with foam layer 18, as indicated by the double-headed arrows in FIG. 2C. If desired, a vibratory device (not illustrated) may be employed to "shake" or otherwise gyrate the elongate members. Given the great variety of glass and foams, as well as types of non-screen-like, foam-disturbing devices that might be used, the rates of rotation are hard to quantify, but as with other embodiments described herein, optimal rates of rotation will be identified without substantial or undue experimentation. The rates of rotation of substantially vertical, rotatable elongate members 502 and substantially horizontal, rotatable elongate members 508 must not be so great so as to cause more foam to form, but the rates of rotation should be high enough so that at least some of the foam is impacted by a force sufficient to break some of the bubbles in foam layer 18. For a set of three elongate members 502 on a single shaft, rates of rotation may range from about 10 revolutions per minute (rpm) up to about 100 rpm, or from about 10 rpm up to about 50 rpm. Similar rates of rotation would be appropriate for elongated members 508. Foam-disturbing devices 502, 508 may be comprised of a material or materials resistant to the molten glass and foam in the downstream apparatus, and configured to contact at least a portion of the foam in a continuous or intermittent fashion.

Figure 2A:
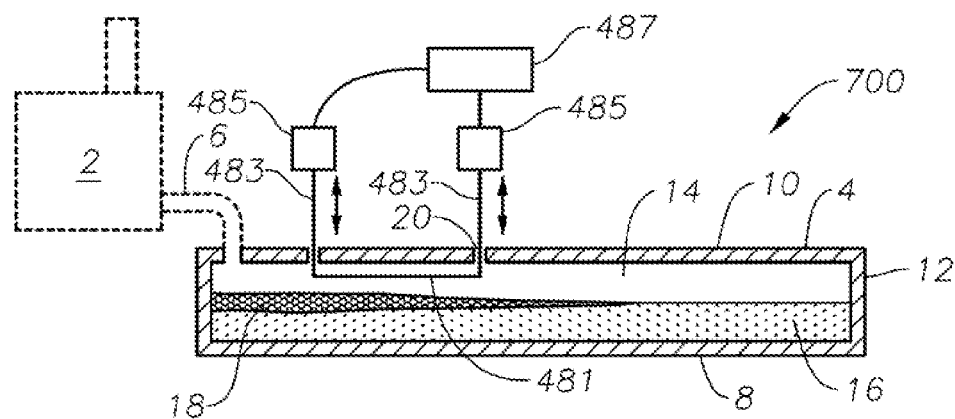
Figure 2B:
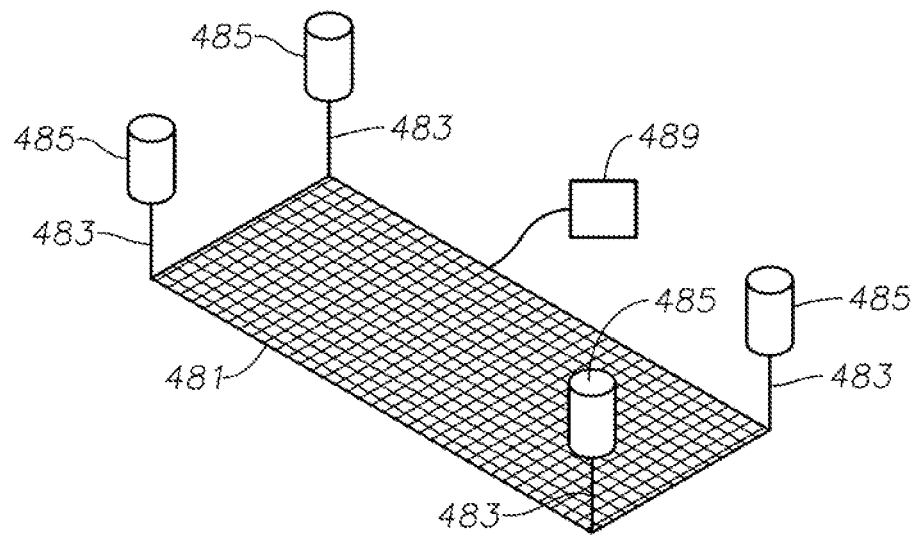
FIG. 2B is a schematic perspective view of a screen and associated equipment that may be useful in the system illustrated in FIG. 2A.
Figure 2C:
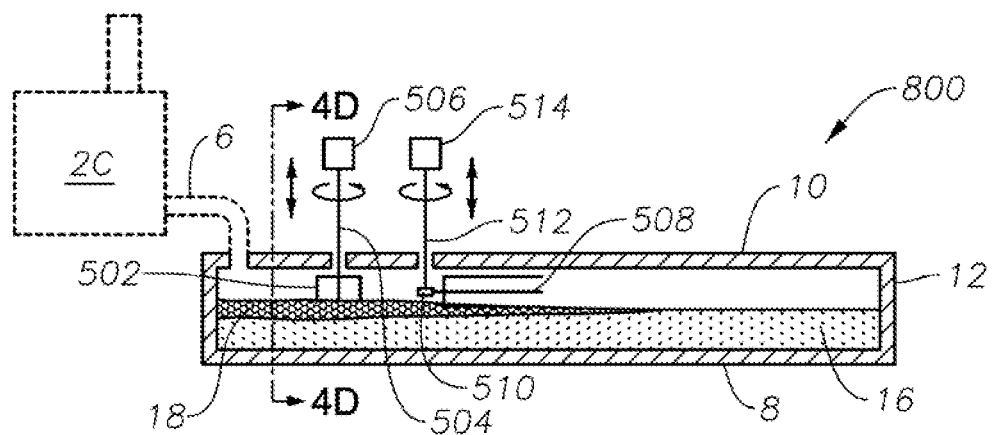
Figure 2D:
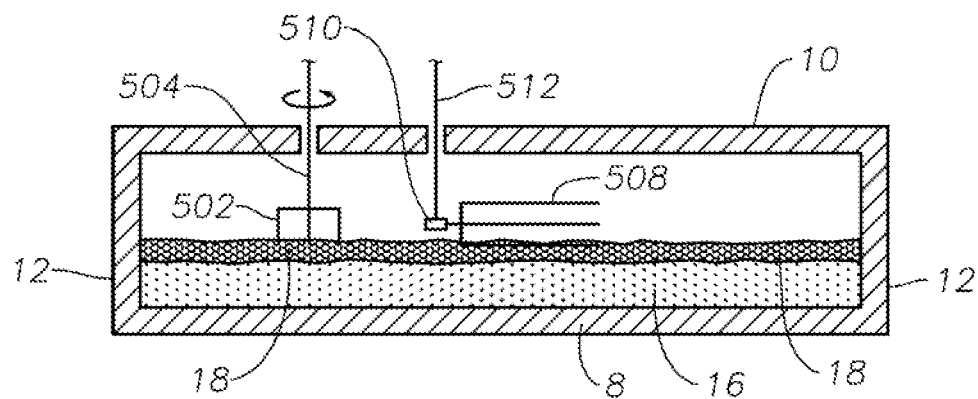
Figure 2E:
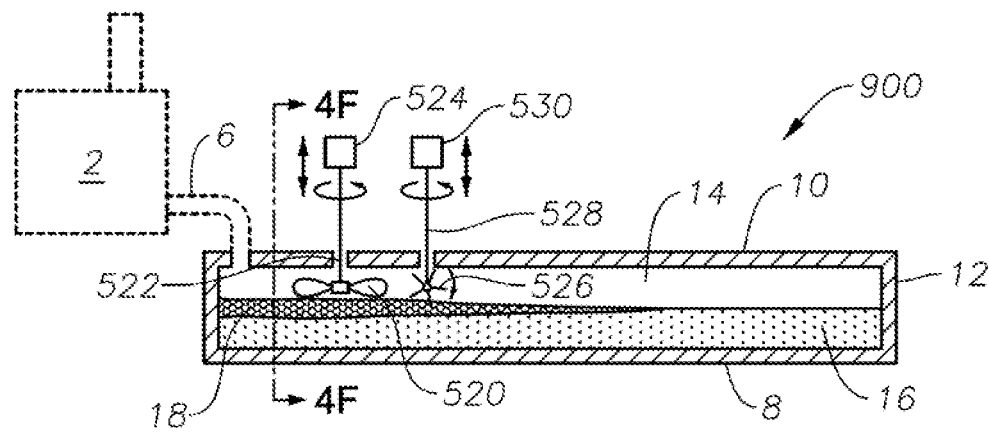
Figure 2F:
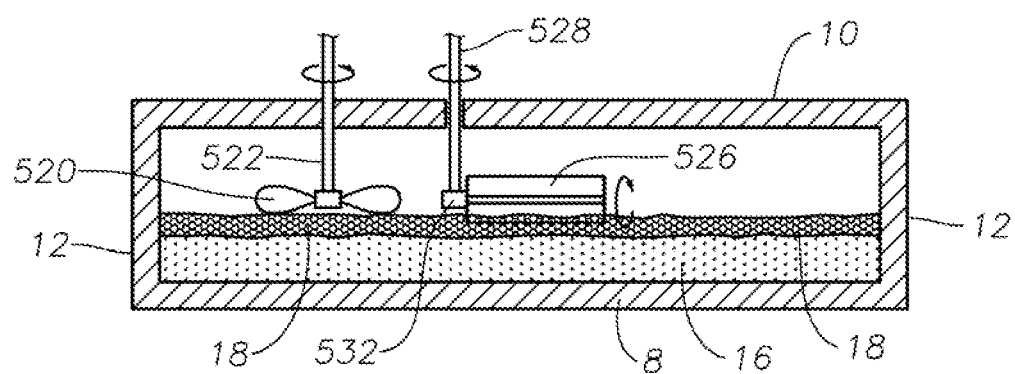

An embodiment 900 of foam de-stabilization device comprising one or more moveable relatively flat or curved plates, blades, paddles, or wings is illustrated schematically in FIGS. 2E and 2F. Embodiment 900 includes one or more moveable, fan blades 520 connected to a shaft 522, which is in turn connected to a motor 524 or other prime mover able to rotate shaft 522. An alternative embodiment includes one or more paddles 526 connected to a shaft 528 and motor 530 through a gear box 532. Motors 524, 530 may be configured to be able to move blades 520 and paddles 526 into and out of contact with foam layer 18, as indicated by the double-headed arrows in FIG. 2E. If desired, a vibratory device (not illustrated) may be employed to "shake" or otherwise gyrate shafts 522, 528 and/or blades 520 or paddles 526. The rates of rotation of blades 520 and paddles 526 must not be so great so as to cause more foam to form, but the rates of rotation should be high enough so that at least some of the foam is impacted by a force sufficient to break some of the bubbles in foam layer 18. Given the great variety of glass and foams, as well as types of non-screen-like, foam-disturbing devices that might be used, the rates of rotation are hard to quantify, but as with other embodiments described herein, optimal rates of rotation will be identified without substantial or undue experimentation. For a set of three fan blades 520 on a single shaft, rates of rotation may range from about 10 revolutions per minute (rpm) up to about 100 rpm, or from about 10 rpm up to about 50 rpm. Similar rates of rotation would be appropriate for paddles 526. Foam-disturbing devices 520, 526 may be comprised of a material or materials resistant to the molten glass and foam in the downstream apparatus, and configured to contact at least a portion of the foam in a continuous or intermittent fashion.

Systems and methods of the present disclosure may be combined with other strategies for foam de-stabilization. Systems and methods of the present disclosure decrease bubble stability when used separately or in conjunction with one or more downstream methods. For example, adding nitrogen as a treating composition to the molten mass of glass and bubbles in the downstream apparatus may tend to make bubbles in foam 18 less stable when there is the presence of a high moisture atmosphere in the downstream apparatus. A high moisture atmosphere may exist in the downstream apparatus for example when one or more high momentum burners (whether oxy/fuel or not) are used as impingement burners in the downstream apparatus to impinge on foam 18. The use of one or more high momentum impingement burners (whether oxy/fuel or not) in a downstream flow channel is described in Applicant's U.S. Pat. No. 8,707,739.

Measuring effectiveness of the foam de-stabilization systems and methods described here may generally be made by taking samples of the molten mass of glass and counting bubbles and their size in the molten mass, or a solidified or partially solidified sample thereof, using the naked eye. Another naked eye measurement may simply be comparing an acceptable glass to a glass sample made using a system and method of the present disclosure, and making a naked eye comparison. Another method would be to simply observe the height of foam or bubbles within a channel or other downstream apparatus, using graduated marks on refractory materials to serve as a ruler, or use of known heights of construction materials for the sidewalls to access the height of the foam. More sophisticated methods and equipment may certainly be used, such as image analysis using computers to measure size, size distribution and quantity of bubbles (or other parameters) within a high-resolution photograph or micrograph of the material to be analyzed. For example, companies such as Glass Service market methods and equipment for such measurements. The glass melting method, as well as phenomena within the melt, may be continuously observed, recorded and evaluated using a high temperature observation furnace equipped with a special silica observation crucible. This equipment may be further coupled with image analysis equipment to provide easy manipulation of recorded data. For example, in a "melt test", the objective is to evaluate the fining characteristics of differing batch compositions. The area of the recorded images occupied by inhomogeneities (bubbles), bubble size distribution, bubble number, as well as bubble growth rates vs. melting time, may be evaluated to provide comparison between individual batches. The records of the melting course may be provided in the form of video files, which may be displayed on a personal computer, handheld computer, or other viewer. Bubble growth rate, or shrinkage rate, or rate of disappearance measurements may be based on direct observation and recording of bubble sizes depending on time. It is possible to keep bubbles suspended in the melt for hours by the developed "shuttle" method.

In embodiments of the present disclosure, a reduction of 5 percent, or 10 percent, or 20 percent, or 30 percent or more of foam may be acceptable. In other embodiments, nothing short of complete or substantially complete foam or bubble removal will suffice, in other words 90 percent, or 95 percent, or 99 percent, or even 99.9 percent reduction in foam and bubbles.

Figure 3:
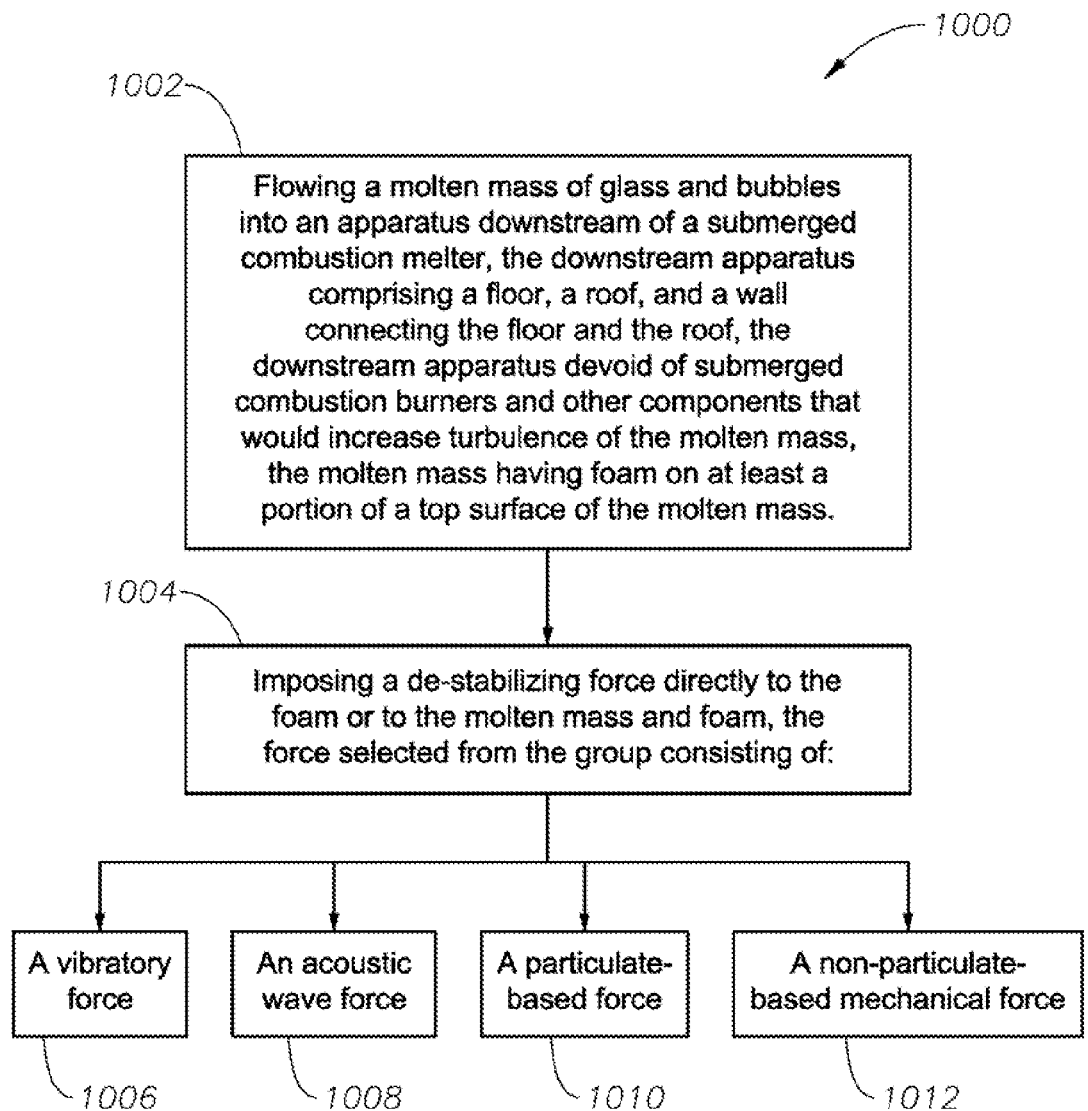
FIG. 3 is a logic diagram of one method embodiment of the present disclosure.

FIG. 3 is a logic diagram of one method embodiment 1000 of the present disclosure. Method embodiment 1000 includes flowing a molten mass of glass and bubbles into an apparatus downstream of a submerged combustion melter, the downstream apparatus comprising a floor, a roof, and a wall connecting the floor and the roof, the downstream apparatus devoid of submerged combustion burners and other components that would increase turbulence of the molten mass, the molten mass having foam on at least a portion of a top surface of the molten mass (box 1002). The method further comprises imposing a de-stabilizing force directly to the foam or to the molten mass and foam (box 1004), the force selected from the group consisting of a vibratory force (box 1006), an acoustic wave force (box 1008), a particulate-based force (box 1010), and a non-particulate-based mechanical force (box 1012).

The downstream apparatus 4 may include one or more bushings (not illustrated) for example when producing glass fiber (not illustrated). Downstream apparatus for use in systems and methods of the present disclosure may comprise a roof, floor and sidewall structure comprised of an outer metal shell, non-glass-contact brick or other refractory wall, and glass-contact refractory for those portions expected to be in contact with molten glass. Downstream apparatus may include several sections arranged in series, each section having a roof, floor, and sidewall structure connecting its roof and floor, and defining a flow channel for conditioning molten glass flowing there through. The sections may be divided by a series of skimmers, each extending generally substantially vertically downward a portion of a distance between the roof and floor of the channel, with a final skimmer positioned between a last channel section and a forehearth. The number of sections and the number of skimmers may each be more or less than two. The downstream apparatus may be rectangular as illustrated in the various figures, or may be a shape such as a generally U-shaped or V-shaped channel or trough of refractory material supported by a metallic superstructure.

The flow rate of the molten glass through downstream apparatus 4 (unless it is a holding container without flow) will depend on many factors, including the geometry and size of the SCM and downstream apparatus, temperature of the melt, viscosity of the melt, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Low momentum detonation combustion burners useful in systems and methods of this disclosure may include some of the features of those disclosed in Applicant's U.S. Pat. No. 9,021,838. For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

Submerged combustion melters may be fed a variety of feed materials. The initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in Applicant's U.S. Publication Nos. 2007/0220922 and 2008/0276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from U.S. Publication No. 2007/0220922. Notice that during glass melting, carbon dioxide (from lime) and water (borax) evaporate. The initial raw material can be provided in any form such as, for example, relatively small particles.

TABLE 1

Typical E-glass batches

| Raw material | A Limestone (Baseline) | B Quicklime | C Ca Silicate | D Volcanic Glass | E Ca Silicate & Volcanic Glass | F Quartz-free #1 | G Quartz-free #2 | H Limestone Slag | I Ca Silicate Slag | J Quartz-free #3 | K Quartz and Clay Free | L Ca Silicate/Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.0% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 |

SCMs may also be fed by one or more roll stands, which in turn supports one or more rolls of glass mat, as described in Applicant's U.S. Pat. No. 8,650,914, incorporated herein by reference. In certain embodiments powered nip rolls may include cutting knives or other cutting components to cut or chop the mat (or roving, in those embodiments processing roving) into smaller length pieces prior to entering melter 602. Also provided in certain embodiments may be a glass batch feeder. Glass batch feeders are well-known in this art and require no further explanation.

Downstream apparatus may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Certain embodiments may comprise a method control scheme for the downstream apparatus. For example, as explained in the '914 patent, a master method controller may be configured to provide any number of control logics, including feedback control, feed-forward control, cascade control, and the like. The disclosure is not limited to a single master method controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to one or more foam de-stabilization elements, and/or to local devices associated with foam de-stabilization elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of Applicant's U.S. Pat. No. 8,973,400, using the vibrations and oscillations of the melter itself, may prove useful predictive control inputs.

The downstream apparatus floors and sidewall structures may include a glass-contact refractory lining. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in downstream apparatus described herein may be cast concretes such as disclosed in U.S. Pat. No. 4,323,718. Two cast concrete layers are described in the '718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the downstream apparatus, components that require resistance to high temperatures, such as particle guns, rotating blades and paddles, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the geometry of the downstream apparatus and the foam de-stabilization equipment used, and the type of glass to be produced.

Those having ordinary skill in this art will appreciate that there are many possible variations of the systems and methods described herein, and will be able to devise alternatives and improvements to those described herein that are nevertheless considered to be within the claims.

What is claimed is:

1. A system comprising:
an apparatus configured to be fluidly connected downstream of a submerged combustion melter, the downstream apparatus comprising a floor, a roof, a wall structure connecting the floor and roof, the floor, roof, and wall structure defining an internal space configured to contain a flowing or non-flowing molten mass of glass and foam, the apparatus devoid of submerged combustion burners and other components that would increase turbulence of the molten mass, the molten mass having a foam layer on at least a portion of a top surface of the molten mass; and
one or more vibration apparatus connected to the downstream apparatus via one or more connecting members, the one or more connecting members connected to one or more of the floor, the wall, and the roof of the downstream apparatus, the vibration apparatus configured to impose a vibratory de-stabilizing force having a frequency and amplitude to the molten mass and foam layer sufficient to de-stabilize bubbles in one or more portions or locations of the foam layer and cause at least some of the bubbles in the foam layer to break.

2. The system of claim 1 wherein the vibration apparatus is configured to impose a vibratory motion having a frequency and amplitude to the molten mass and foam sufficient to de-stabilize bubbles in the foam and cause at least a majority of the bubbles in the foam to break.

3. The system of claim 2 wherein the vibration apparatus is configured to vary the frequency and/or amplitude to identify an optimal frequency for de-stabilizing the majority of the bubbles in the foam and cause at least a majority of the bubbles in the foam to break.

4. The system of claim 1 wherein the vibration apparatus is configured to exert the vibratory de-stabilizing force in one or more directions.

5. The system of claim 4 wherein the vibration apparatus is configured to exert the vibratory de-stabilizing force horizontally only.

6. The system of claim 4 wherein the vibration apparatus is configured to exert the vibratory de-stabilizing force vertically only.

7. The system of claim 4 wherein the vibration apparatus is configured to exert the vibratory de-stabilizing force both horizontally and vertically.

8. The system of claim 1 wherein the vibration apparatus is selected from the group consisting of electric, hydraulic, and pneumatic vibration apparatus.

9. The system of claim 1 wherein the vibration apparatus is configured to exert the vibratory de-stabilizing force substantially constantly over a given time period.

10. The system of claim 1 wherein the vibration apparatus is configured to exert the vibratory de-stabilizing force variably in frequency and/or amplitude over time.

11. The system of claim 1 wherein the vibration apparatus configured to exert the vibratory de-stabilizing force is a rotary apparatus.

12. The system of claim 1 wherein the vibration apparatus configured to exert the vibratory de-stabilizing force is a linear apparatus.

13. The system of claim 1 wherein the vibration apparatus configured to exert the vibratory de-stabilizing force employs a fixed in place mounting system.

14. The system of claim 1 wherein the vibration apparatus configured to exert the vibratory de-stabilizing force employs a portable mounting system.

15. The system of claim 1 wherein the vibration apparatus configured to exert the vibratory de-stabilizing force is stainless steel.

16. The system of claim 1 wherein the vibration apparatus configured to exert the vibratory de-stabilizing force is explosion proof.

* * * * *